(12) United States Patent
Abraham

(10) Patent No.: US 8,296,278 B2
(45) Date of Patent: Oct. 23, 2012

(54) IDENTIFYING PRODUCT ISSUES USING FORUM DATA

(75) Inventor: Robin Abraham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 12/211,869

(22) Filed: Sep. 17, 2008

(65) Prior Publication Data

US 2010/0070503 A1    Mar. 18, 2010

(51) Int. Cl.
*G06F 17/30* (2006.01)
(52) U.S. Cl. .................. 707/705; 707/737
(58) Field of Classification Search .......... 707/705, 707/737
See application file for complete search history.

(56) References Cited

U.S. PATENT DOCUMENTS

| | | | |
|---|---|---|---|
| 6,112,194 A | 8/2000 | Bigus | |
| 6,915,282 B1 | 7/2005 | Conway et al. | |
| 7,092,941 B1 | 8/2006 | Campos | |
| 7,099,879 B2 * | 8/2006 | Tacaille et al. | 707/737 |
| 7,401,087 B2 * | 7/2008 | Copperman et al. | 707/737 |
| 2002/0062368 A1 * | 5/2002 | Holtzman et al. | 709/224 |
| 2003/0163485 A1 * | 8/2003 | Goodwin et al. | 707/104.1 |
| 2004/0093244 A1 | 5/2004 | Hatcher et al. | |
| 2006/0020520 A1 * | 1/2006 | Lange et al. | 705/26 |
| 2007/0067159 A1 | 3/2007 | Basu et al. | |
| 2007/0100779 A1 * | 5/2007 | Levy et al. | 705/500 |
| 2007/0276676 A1 * | 11/2007 | Hoenig et al. | 705/1 |
| 2009/0193028 A1 * | 7/2009 | Kaplan | 707/10 |
| 2009/0222811 A1 * | 9/2009 | Faus et al. | 717/173 |
| 2010/0070542 A1 * | 3/2010 | Feinsmith | 707/812 |
| 2010/0198730 A1 * | 8/2010 | Ahmed et al. | 705/50 |
| 2010/0325107 A1 * | 12/2010 | Kenton et al. | 707/723 |

FOREIGN PATENT DOCUMENTS

WO    2007134371 A1    11/2007

OTHER PUBLICATIONS

"Intelligent Enterprise", downloaded Aug. 5, 2008 from http://www.intelligententerprise.com/showArticie.jhtml?articieID=59301201, pp. 8.
Kim et al., "A Semi-Supervised Document Clustering Technique for Information Organization", 2000, Proceedings of the $9^{th}$ Int'l Conf. on Information and Knowledge Management, pp. 30-37.
Zhong et al., "Generative Model-based Document Clustering: A Comparative Study". Sep. 2005, Journal of Knowledge and Information Systems, 8(3):374-384.
Bhavani Thusaisingham, "Web Data Mining and Applications in Business Intelligence and Counter-Terrorism (Handcover)", CRC, 1 edition, Jun. 26, 2003, pp. 6.
"Intelligent Enterprise", retrieved at <<http://www.intelligententerprise.com/showArticle.jhtml?articleID=59301201>>, pp. 8.

(Continued)

*Primary Examiner* — Kim Nguyen
(74) *Attorney, Agent, or Firm* — Hope Baldauff Hartman, LLC

(57) ABSTRACT

Product issues are identified through an analysis of forum data stored in a forum database. Forum threads are identified within the forum data and clustered together by grouping related forum threads. Once the forum threads have been clustered, the clustered forum threads can be analyzed to identify product issues. Once the product issues have been identified, steps may be taken in an attempt to resolve the identified issues.

19 Claims, 6 Drawing Sheets

OTHER PUBLICATIONS

"E-Consultancy", May 8, 2008, retrieved at <<http://www.e-consultancy.com/news-blog/365644/seurat-s-lesson-for-marketers.html>>, pp. 5.

Jensen, et al., "Data Mining for Software Process Discovery in Open Source Software Development Communities", International Workshop on Mining Software Repositories (MSR 2004), W17S Workshop—26th International Conference on Software Engineering, 2004, pp. 96-100.

Don McDowell, "Strategic Intelligence Analysis Course", Intelligence Study Centre, 2008, retrieved at <<http://www.intstudycen.com/docs/Strat-Int_Course_Details_-_Hollabd_-_sep2008_(PDF)_.pdf>>, pp. 1-5.

"Customer Relationship Management", May 8, 2008, retrieved at <<http://blog.gartner.com/blog/crm.php>>, pp. 12.

Dreiheller, et al., "Programming Pascal With Physical Units", ACM SIGPLAN Notices, No. 12, vol. 21, 1986, pp. 114-123.

Lisper, et al., "Haxcel: A Spreadsheet Interface to Haskell", Proceedings Int. workshop on the Implementation of functional langauges, 2002, pp. 206-222.

Powell, et al., "A Critical Review of the Literature on Spreadsheet Errors", SERP report, Tuck School of Business, Dartmouth College, Hanover, 2006, pp. 1-34.

Bansal, et al., "Correlation Clustering", Proceeding of The 43rd Annual IEEE Symposium on Foudations of Computer Science (FOCS'02), 2002, pp. 238-247.

Bansal, et al., "Correlation Clustering", Machine Learning, vol. 56, No. 1-3, 2004, pp. 89-113.

Basu, et al., "Semi-Supervised Clustering by Seeding", in the Proceedings of the 19th International Conference on machine Learning (ICML'02), 2002, pp. 19-26.

ghee, et al., "Document Clustering Using Small World Communities", Proceedings of the 7th ACM/IEEE-CS joint conference on Digital libraries, 2007, pp. 53-62.

Cheng, et al., "Biclustering of expression Data", Proceedings of International Conference on intelligent systems for molecular Biology, 2000, pp. 93-103.

Cheng, et al., "A-Divide and Merge Methodology for Clustering", Proceedings of the Principles of database systems, 2005, pp. 196-205.

Chim, et al., "A New Suffix Tree Similarity Measure for Document Clustering", Proceedings of the 16th International Conference on World Wide Web, 2007, pp. 121-130.

Cutting, et al., "Scatter/Gather: A Cluster—Based Approach to Browsing Large Document Collections", Proceedings of the 15th International, ACM, SIGIR Conference on Research and Development in Information Retrieval, 1992, pp. 318-329.

Dhillon, et al., "Concept Decompositions for Large Sprase Text Data Using Clustering", Machine Learning, vol. 42, 2001, pp. 143-175.

Inderjit S. Dhillon, "Co-Clustering Documents and Words Using Bipartite Spectral Graph Partitioning", Proceedings of the ACM International Conference on Knowledge Discovery and Data Mining, 2001, pp. 269-274.

Ding, et al., "A Min-Max Cut Algorithm for Graph Partitioning and Data Clustering", Proc. of the IEEE Conf. on Data Mining, 2001, pp. 107-114.

Vladimir Estivill-Castro, "Why So Many Clustering Alogorithms—A Position Paper", SIGKDD Explorer Newsletter, vol. 4, No. 1, 2002, pp. 65-75.

Hamerly, et al., "Alternatives to the K-Means Algorithm That Find Better Clusterings", Proc. of the 11th International Conference on Information and Knowledge Management, 2002, pp. 600-607.

Hammouda, et al., "Efficient Phrase-Based Document Indexing for Web Document Clustering", IEEE Trans. on Knowledge and Data Eng., vol. 16, 10, 2004, pp. 1279 1296.

Hammouda, et al., "CorePhrase: Keyphrase Extraction for Document Clustering", Machine Learning and Data Mining in Pattern Recognition, 2005, pp. 265-274.

Hammouda, et al., "Collaborative Document Clustering", SIAM Conference on Data Mining, 2006, pp. 451-461.

J.A. Hartigan, "Direct Clustering of a Data Matrix", Journal of the American Statistical Association, vol. 67, No. 337, 1972, pp. 123-129.

David D. Hull, "Stemming Algorithms: A Case Study for Detailed Evaluation", Journal of the American Society for Information Science, vol. 47, 1, 1996, pp. 70-84.

Karypis, et al., "Multilevel Algorithms for Multi-Constraint Graph Partitioning", Proceedings of the ACM/IEEE Conference on Supercomputing, 1998, pp. 1-17.

Salton, et al., "A Vector Space Model for Automatic Indexing", Communication of the ACM, vol. 18, No. 11, 1975, pp. 613-620.

Schulze, et al., "Projections for Efficient Document Clustering", Proceedings of the 20th International ACM SIGIR Congerence on Research and Development in Information Retrieval, 1997, pp. 74-81.

Chaitanya Swamy, "Correlation Clustering: Maximizing Agreements Via Semidefinite Programming", Proc. of the ACM-SIAM Symposium on Discrete Alogorithms, 2004, pp. 526-527.

Tjhi, et al., "Fuzzy Co—Clustering of Web Documents", Proceedings of the International Conference on Cyberworlds, 2005, pp. 545-551.

Wagstaff, et al., "Clustering With Instance-Level Constraints", Proceedings of the Seventeenth International Conference on Machine Learning, 2000, pp. 1103-1110.

Wang, et al., "Regularized Clustering for Documents", Proceedings of the 30th Annual international ACM SIGIR Conference on Research and Development in Information Retrieval, 2007, pp. 95-102.

Xu, et al., "Document Clustering by Concept Factorization", Proceedings of the 27th International ACM SIGIR Conference on Research and Development in Information Retrieval, 2004, pp. 202-209.

Zamir, et al., "Web Document Clustering: a Feasibility Demonstration", Proceedings of the 21st International ACM SIGIR Conference on Research and Development in Information Retrieval, 1998, pp. 46-54.

Zhao, et al., "Evaluation of Hierarchical Clustering Algorithms for Document Datasets", Proceedings of the 11th International Conference on Information and Knowledge Management, 2002, pp. 515-524.

S. Zahong, "Efficient Online Spherical K-Means Clustering", IEEE International Joint Conference on Neural Networks, 2005, pp. 3180-3185.

"Microsoft, Vista SP1 TechNet Forum", Retrieved at <<http://forums.microsoft.com/TechNet/>>, Sep. 15, 2008, pp. 9.

Kim, et al., "A Semi-Supervised Document Clustering Technique for Information Organization", School of Computer Science and Engineering Seoul National University, pp. 30-37.

"Porter, M.F., An Algorithm for Suffix Stripping", Retrieved at <<http://tartarus.org/~martin/PorterStemmer/def.txt>>, Sep. 15, 2008, pp. 7.

Zhong, et al., "Generative Model-based Document Clustering: A Comparative Study", pp. 25.

Nardi Bonnie A., "A Small Matter of Programming: Perspectives on End-User Computing", The MIT Press, Cambridge, MA, 1993, pp. 2.

Bing Liu, "Springer,Web Data Mining: Exploring Hyperlinks, Contents, and Usage Data", 2007, pp. 2.

\* cited by examiner

| | THREAD 202A | LAST POST 202B | REPLIES 202C | VIEWS 202D |
|---|---|---|---|---|
| | ANNOUNCEMENTS AND FAQS | | | |
| 204A | NEW WINDOWS VISTA SP1 RC FAQ AVAILABLE BY ANTHONY MAN [MSFT] 12 DEC 2007, 6:16 AM | BY SOCALFISH 01 MAR 2008 1:28 AM | 9 | 16,848 |
| 204B | NEW WINDOWS VISTA SP1 RC FAQ AVAILABLE BY ANTHONY MAN [MSFT] 12 DEC 2007, 6:16 AM | BY MARKYGOLDSTEIN 24 FEB 2008 8:50 PM | 11 | 9,748 |
| 204C | FORUM ETIQUETTE/PROCEDURE – PLEASE READ BY ANTHONY MANN [MSFT] 18 DEC 2007, 12:40 AM | BY ANTHONY MANN 18 DEC 2007 12:40 AM | - | 696 |
| | ANNOUNCEMENTS AND FAQS | | | |
| 204D | WHERE IN MSDN CAN I FIND SP1? BY SIRRO2 TODAY, 9:10 AM UTC | BY M0 TODAY, 10:01 PM UTC | 4 | 180 |
| 204E | WINDOWS VISTA ULTIMATE X64 SP1 NOT PROPERLY DRAWING WINDOW SCREEN... BY M0 07 JAN 2008, | BY M0 TODAY, 9:47 PM UTC | 31 | 1,962 |
| 204F | FOLDER REDIRECTION DOSENT WORK AGAIN WITH VISTA SP1 BY PAT GERBER 29 FEB 2008, 10:24 AM UTC | BY MICHAEL DAVID TODAY, 9:23 PM UTC | 1 | 73 |
| 204G | VISTA SP1 X64 LAGG ISSUES WITH COD4 AND GEARS OF WAR BY ZNEMZ 01 MAR 2008, 6:57 PM UTC | BY ZNEMZ TODAY, 7:12 PM UTC | 4 | 115 |

Fig. 2

IDENTIFYING PRODUCT ISSUES USING FORUM DATA

BACKGROUND

Many companies provide electronic forums associated with their products so that users of the products, and often the actual developers of the products, can communicate with one another regarding problems they encounter. A forum is a network-accessible application that provides functionality for holding discussions and exchanging information. Forums are commonly referred to as World Wide Web ("Web") forums, message boards, discussion boards, bulletin boards, or simply forums.

People who encounter an issue with a product might visit a company's forums in an attempt to obtain information related to the issue. In order to discover relevant information, a person might search for existing forum threads (groupings of related messages that are typically in reply to one another) that relate to their issue. If the search finds a relevant, or event related, thread, the user might create a new post within the thread regarding their issue. If the search does not find any relevant threads, the user might initiate the creation of a new thread on the forum.

A user might also initiate a new thread if she is unwilling to browse through information posted on the forum to locate threads regarding the issue, is unaware that she can search the contents of the forum, or if she is unable to effectively formulate a search query to obtain relevant information. Even if a search of the forum is performed, a user may also initiate a new thread if she is unable to interpret related threads that are returned as search results or if the issue encountered by the user does not align fully with issues covered by existing threads on the forum.

As a result, it is common for new threads to be created even when other threads exist regarding the same issue. Consequently, hundreds or even thousands of threads may be created within a forum relating to a much smaller number of issues. Due to this large number of threads, identifying and triaging the particular issues that customers are posting about on a forum can become an intractable problem. As a result, from the sponsoring organization's perspective, forums have become a purely reactive venue.

It is with respect to these considerations and others that the disclosure made herein is presented.

SUMMARY

Technologies are described herein for identifying product issues using forum data. In particular, through the use of the concepts and technologies presented herein, forum data can be mined and analyzed to identify significant issues with a product. Once the issues have been identified through the use of the forum data, proactive measures can be taken to address the identified issues. For instance, targeted support may be provided to address the most significant issues regarding a product that have been identified through an analysis of forum data.

According to one aspect presented herein, product issues are identified through an analysis of forum data stored in a forum database. In order to identify the product issues, forum threads are identified within the forum data. The forum threads are then clustered together by grouping related forum threads. Domain-specific information may also be used to cluster forum threads. For instance, forum threads may be clustered together if they have a weak or a strong relationship with one another. A threshold may be specified indicating the strength of the relationship between two forum threads that is necessary to have the forum threads clustered together.

A strong relationship between forum threads may be indicated by a manual grouping of forum threads, such as a manual grouping performed by a system administrator. A strong relationship between forum threads may also be indicated by a strong similarity of keywords present in the related forum threads. For instance, two threads may have a strong relationship with one another if they both refer to the same product error code. Other types of indicators may also signify strong relationships between forum threads.

A weak relationship between forum threads may be indicated by one or more hyperlinks from one forum thread to another. Similarly, a weak relationship may also be indicated by the identity of a user that has posted to several different forum threads. A common user identity that has posted across multiple forum threads may indicate some relationship between the threads. Other types of indicators may also signify weak relationships between forum threads.

Once the forum threads have been clustered, the clustered forum threads can be analyzed to identify product issues. For instance, the clustered forum threads may be analyzed to determine the total number of forum views on a particular issue (e.g. the number of views on posts within clustered threads). A high number of views may be indicative of a product issue. Similarly, the clustered forum threads may be analyzed to determine the total number of forum posts on a particular issue. (e.g. the number of posts within clustered threads). A high number of posts may also be indicative of a product issue. Likewise, product issues may be identified based upon a trend and/or frequency analysis of the number of views on an issue and the number of forum posts on the issue. Other types of analyses may also be performed to identify the product issues.

Once the product issues have been identified, steps may be taken in an attempt to resolve the identified issues. For instance, impact analyses of the identified product issues may be performed, efforts may be focused to ameliorate the product issues, targeted support may be provided to users that have encountered the product issues, and issue-level solutions and fixes may be provided to all or just affected users. Other types of actions may also be taken in an attempt to resolve the identified product issues. In this manner, the postings on forums can be utilized to more quickly identify and resolve product issues.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a user interface diagram showing one illustrative user interface provided by a forum application in embodiments presented herein;

DETAILED DESCRIPTION

Figure 1:
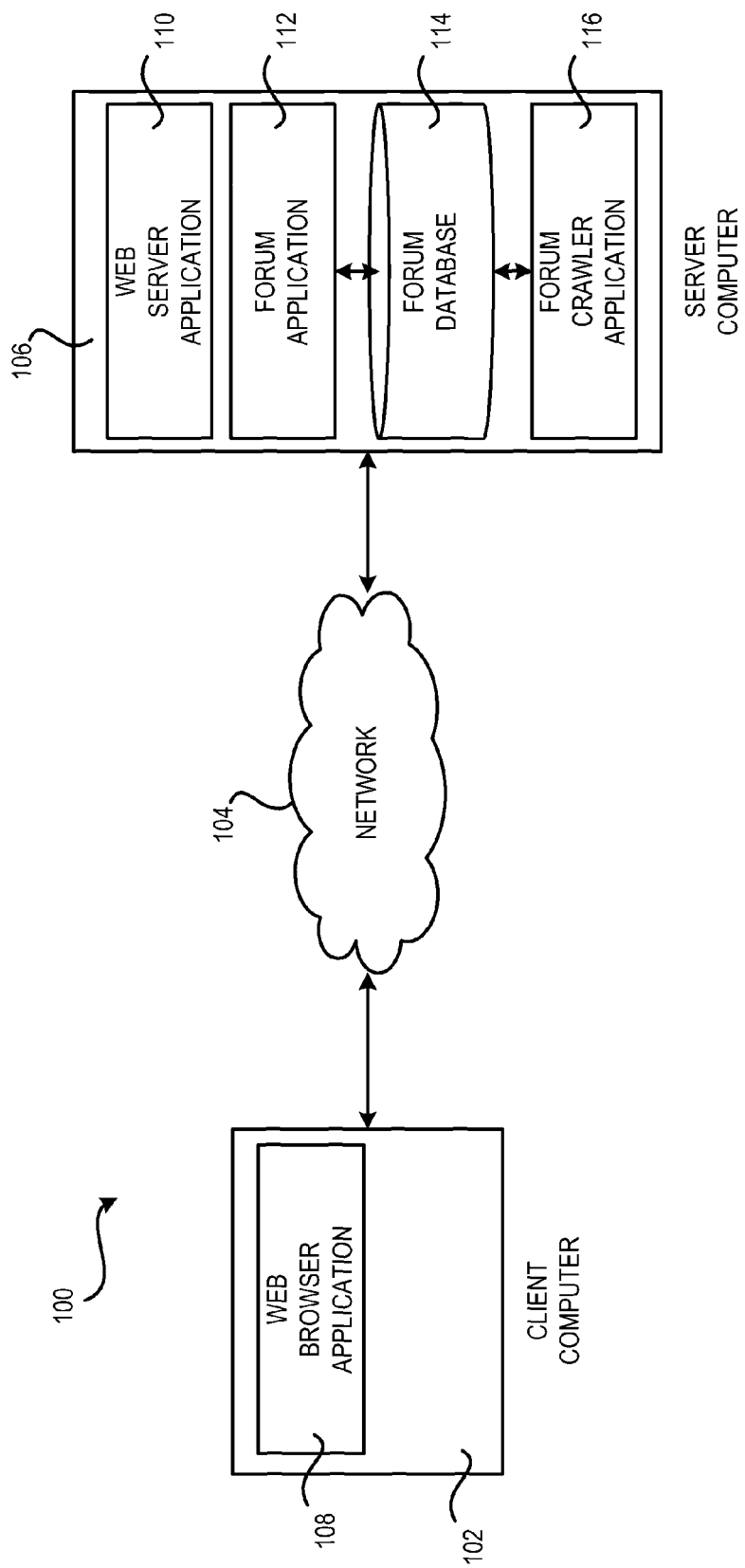
FIG. 1 is a network diagram showing aspects of an illustrative operating environment and several software components provided by the embodiments presented herein.

The following detailed description is directed to technologies for identifying product issues using forum data. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for identifying product issues using forum data will be described.

Turning now to FIG. 1, details will be provided regarding an illustrative operating environment and several software components provided by the embodiments presented herein. In particular, FIG. 1 shows aspects of a system 100 for identifying product issues using forum data. The system 100 illustrated in FIG. 1 includes a client computer 102 and a server computer 106 that are interconnected by a network 104. In one embodiment, the network 104 comprises the Internet. It should be appreciated, however, that the network 104 may comprise other types of local and wide area networks. It should also be appreciated that although a single network 104 is illustrated in FIG. 1, many more networks may be utilized to enable data communication between the client computer 102 and the server computer 106.

The client computer 102 illustrated in FIG. 1 comprises a standard desktop, laptop, or mobile computing device capable of executing a web browser application 108. As known in the art, a web browser application 108 is configured to transmit requests for web pages and other types of documents to a web server application. The web browser application 108 is also configured to receive a reply to the request and to render data returned within the reply. In this manner, a user of the client computer 102 can interact with web sites provided on the Internet or on another type of network. It should be appreciated that the client computer 102 may comprise any type of computing system capable of interacting with an application executing on a remote server computer.

The server computer 106 illustrated in FIG. 1 comprises a standard server computer configured to execute a web server application 110. As known in the art, the web server application 110 is software component configured to receive and respond to requests for web pages and other types of data files stored at or accessible to the server computer 106. In one embodiment, the web server application 110 is configured to receive and respond to requests transmitted by the web browser application 108 for the forum application 112.

The forum application 112 is a web application configured to provide functionality for holding discussions and exchanging information. In this regard, the forum application 112 provides one or more forums upon which users may post messages. As mentioned above, forums are commonly referred to as web forums, message boards, discussion boards, bulletin boards, or simply forums.

In one embodiment presented herein, the forums provided by the forum application 112 are provided with respect to one or more products. For instance, a software manufacturer may utilize the forum application 112 to provide support forums for software products. Through the provided forums, users of the software products may discuss problems with the software products, such as installation or usability issues. As also discussed briefly above, even though organizations often host and administer such forums for their products, there is presently no systematic way to identify product issues utilizing the postings made on the provided forums.

In one embodiment presented herein, the forum application 112 stores forum data in a forum database 114. The forum data includes all of the posts made by users on the forums provided by the forum application 112. According to embodiments, these posts are organized by the forum application 112 into threads. Threads are groupings of related messages that are typically made in reply to one another. For instance, if a first posting is made on a particular issue and then a second posting is made in reply to the first postings, the two postings together will comprise a thread. Additional postings may also be made in reply to either of the first two postings, which will also be considered a part of the thread. It should be appreciated that the forum database 114 may be implemented using any suitable database technology.

According to one embodiment presented herein, a forum crawler application 116 is also provided that is configured to execute on the server computer 106 and to analyze the forum data stored within the forum database 114 to identify product issues. As will be discussed in greater detail below, the forum crawler application 116 is configured to retrieve the forum threads from the forum database 114, to cluster the forum threads, and to evaluate the clustered forum threads to identify product issues. Clustering refers to a process performed by the forum crawler application 116 for grouping related forum threads upon relationships identified therein. Once the forum threads have been clustered, an analysis can be performed of the clustered forum threads to identify the product issues that the forum threads are addressed to. Once the product issues have been identified, steps can be taken to ameliorate the product issues. Additional details regarding the processing performed by the forum crawler application 116 will be provided below with respect to FIGS. 3-5.

Referring now to FIG. 2, one illustrative user interface 200 will be described that is provided by the forum application 112. In particular, the user interface 200 illustrated in FIG. 2 is generated by the web browser application 108 in response to data generated by the forum application 112 and provided by the web server application 110. As shown in FIG. 2, the user interface 200 includes the columns 202A-202D. The column 202A identifies threads within a particular forum provided by the forum application 112. The columns 202B-202D identify the last post within the thread, the number of replies to the thread, and the number of views of the thread, respectively. Each of the rows 204A-204H within the user interface 200 corresponds to a particular thread. For instance, the row 204B corresponds to a thread concerning the reporting of driver bugs.

According to embodiments, the forum application 112 may also provide functionality for allowing a user to create a new post in response to any of the existing threads. The forum application 112 may also provide functionality for searching the forum data for threads or posts corresponding to particular key words entered by a user.

People who encounter product issues may visit the forums provided by the forum application 112 and illustrated in the user interface 200 and search for existing forum threads related to the issue that they have encountered. Oftentimes, if a relevant or even related, thread, is found, the user might create a new post within a thread with their questions, comments, or clarifications.

In general, users might initiate new threads under one or more or the following scenarios: the user is unaware that she can search the contents of the forums; the user is unwilling to invest the time browsing through the information already posted on the forums to identify posts related to their particular issue; the user is unable to effectively formulate the encountered issue so as to obtain relevant information by searching the contents of the forum; the user is unable to interpret related threads that have been returned as a result of one or more search attempts; the issue encountered by the user does not align fully with the issues covered by one or more existing threads on the forum; and the user is unable to find any threads related to the issue she has encountered. As a result, a large number of separate threads pertaining to similar issues may be generated by users and stored as forum data within the forum database 114. Consequently, it can be difficult for the producer of a product to utilize data contained within the forums to identify product issues due to the sheer number of postings. As will be described in greater detail below, the forum crawler application 116 provides functionality for analyzing the forum data contained within the forum database 114 to identify product issues. Additional details regarding this process will be provided below with respect to FIGS. 3-5.

Figure 3:
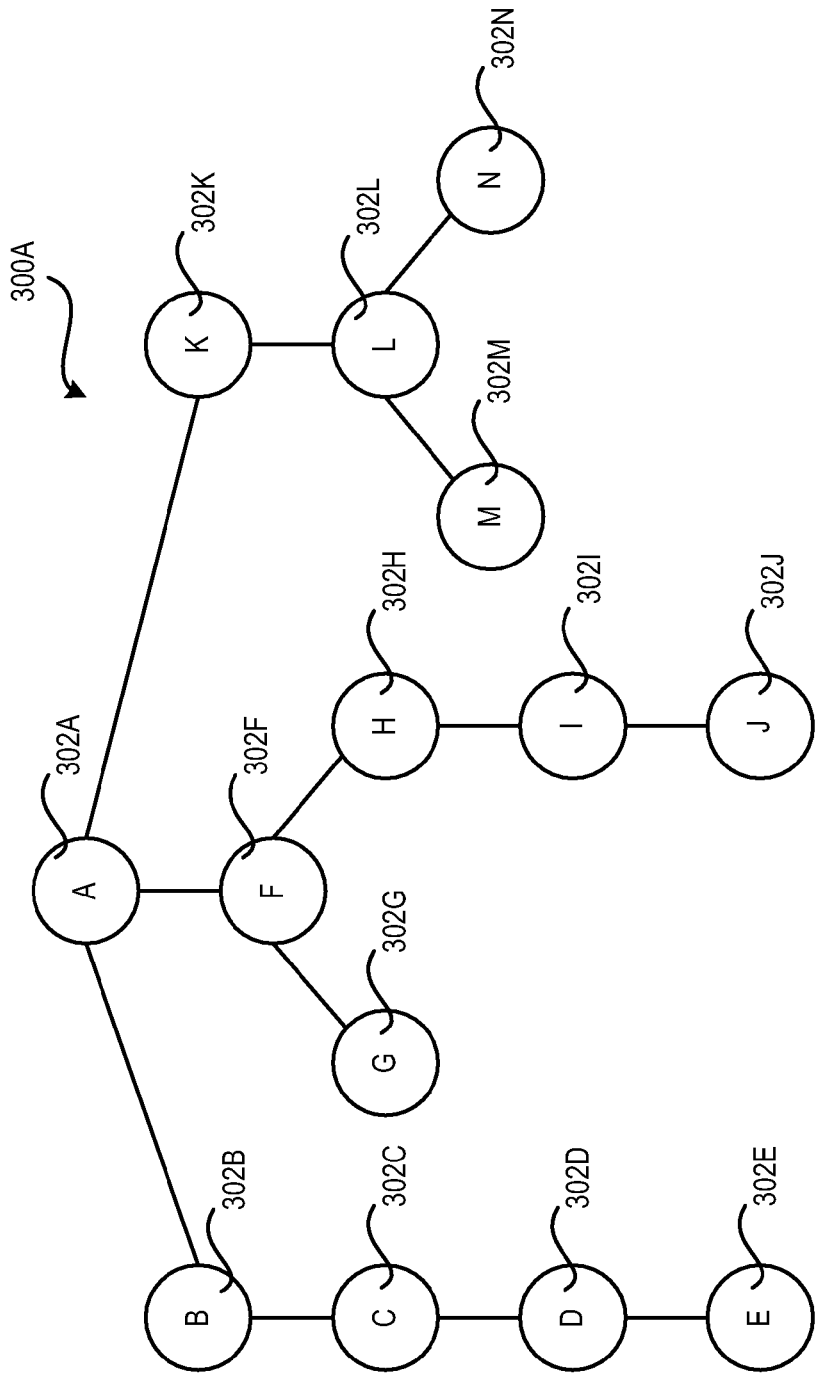
FIG. 3 is a tree diagram illustrating the structure of a threaded forum discussion utilized herein to identify product issues.

Turning now to FIG. 3, a tree diagram will be described that illustrates the structure of one thread 300A. As shown in FIG. 3, a discussion thread 300A can be represented by a tree. In FIG. 3, the nodes of the tree represent the actual postings and the lines interconnecting the nodes show the sequence between the postings. For instance, in the example thread 300A illustrated in FIG. 3, the posting represented by the node 302A started the particular thread 300A of discussion. Three sub-discussions denoted by the sub-trees rooted at the nodes 302B, 302F, 302K originated from the original posting represented by the node 302A. The child of any particular node is the response that was posted in response to the posting represented by that node. For example, the posting represented by the node 302C was posted in response to the posting represented by the node 302B.

It should be appreciated that forums typically permit responses to be made only to a single post. If this constraint is removed, however, a directed acyclic graph representation may be utilized. It should also be appreciated that a post may be made that includes a hyperlink to another post. Hyperlinks such as this would not be identified within the tree structure illustrated in FIG. 3. However, such links may be utilized by the forum crawler application 116 in its analysis of the threads 300 identified within the forum database 114.

Figure 4:
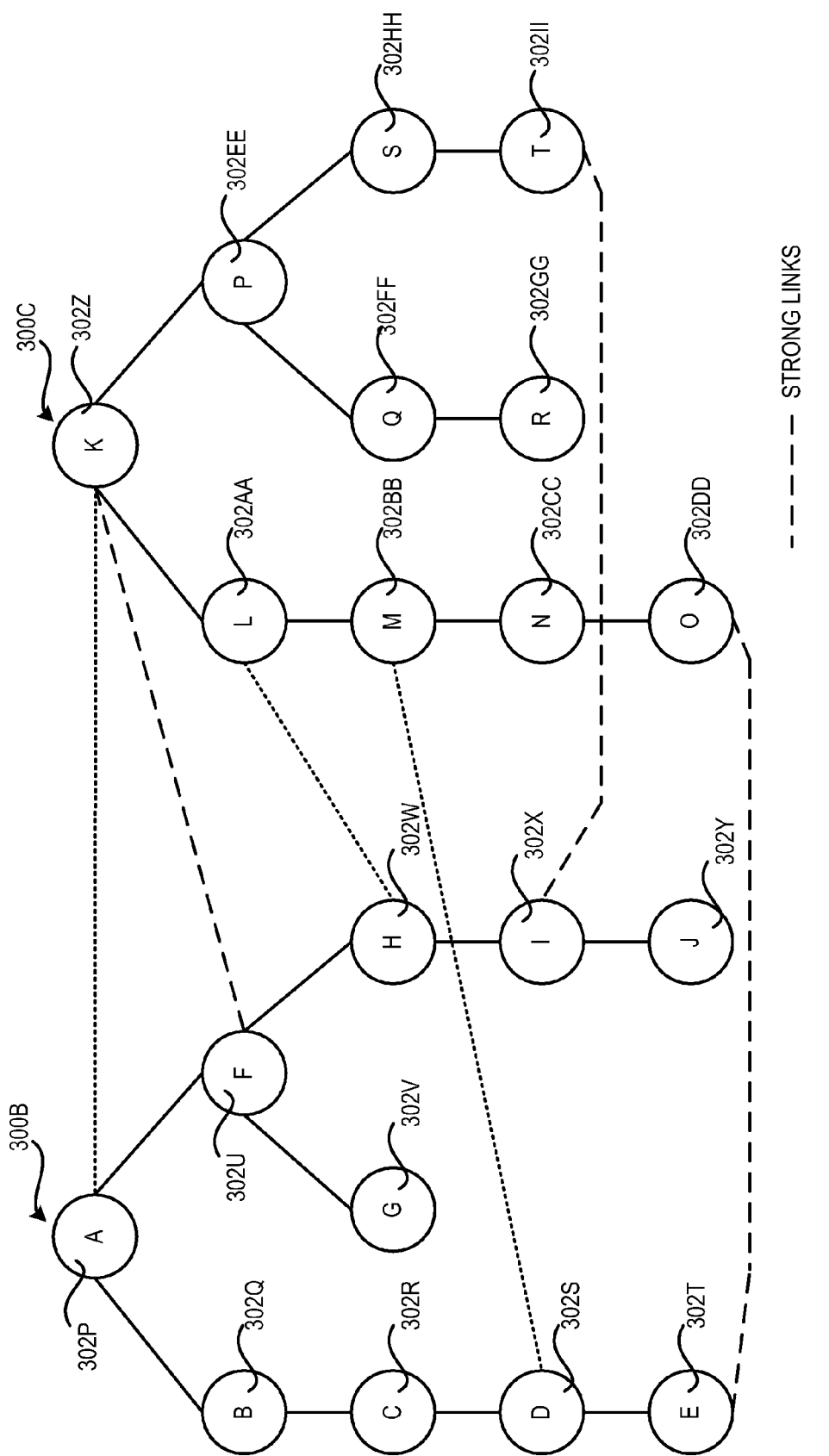
FIG. 4 is a tree diagram showing aspects of one process presented herein for clustering forum posts to identify product issues.

Referring now to FIG. 4, additional details will be provided regarding the clustering process performed by the forum crawler application 116. In order to use the postings in a particular forum effectively, the threads must be clustered on the basis of the issues that they pertain to. In particular, issues can be identified by determining how strongly individual threads are related to one another as determined by links. Strong relationships can be considered strong links and weak relationships can be considered weak links. For instance, strong relationships may be indicated by a manual grouping of related forum threads, such as that performed by a system or administrator, or by the identification of similar keywords present in related forum threads. For instance, strong relationships may be identified between forum threads where a similar error code or topic keywords are identified within the forum threads.

Weak relationships may be inferred wherein hyperlinks are located from one posting to another posting in a different thread and wherein the identity of user is located that has posted to multiple forum threads. It should be appreciated that the factors identified above for inferring strong relationships and weak relationships among forum threads may include other types of factors.

It should also be appreciated that although the discussion provided herein focuses primarily upon identifying related threads within a single forum, groupings of threads can also be identified across multiple forums. For instance, multiple forums may be provided by the forum application 112 for related products. In this case, the clustering process presented herein may be applied across multiple forums.

According to one embodiment presented herein, a user may be permitted to set a threshold for thread clustering. In this implementation, increasing the threshold requires stronger relationships between threads for the threads to be grouped under one issue. Conversely, lowering the threshold allows threads to be more easily grouped under an issue. In the extreme cases, a very high threshold setting will classify each thread on a forum as a separate issue and a lowest threshold setting will group all threads under one issue. Neither of the settings are particularly useful as such. However, settings within this range would make the forum data more useful and manageable.

In the example clustering shown in FIG. 4, two threads 300B-300C are shown. The thread 300B has its root at the node 302P and the thread 300C has its root at the node 302Z. These two threads 300B-300C have been clustered utilizing the process presented herein. The affinity that led to the clustering illustrated in FIG. 4 is due to the presence of strong links between the nodes 302U and 302Z, 302X and 302II, and 302T and 302DD. The clustering illustrated in FIG. 4 is also due to weak links detected between the nodes 302P and 302Z, 302W and 302AA, and 302S and 302BB.

It should be appreciated that once the threads have been clustered in the manner illustrated in FIG. 4, an impact analysis can be performed on the clustered threads to identify particular product issues. Additional details regarding this process and additional aspects of the clustering process performed by the forum crawler application 116 will be provided below with respect to FIG. 5.

Figure 5:
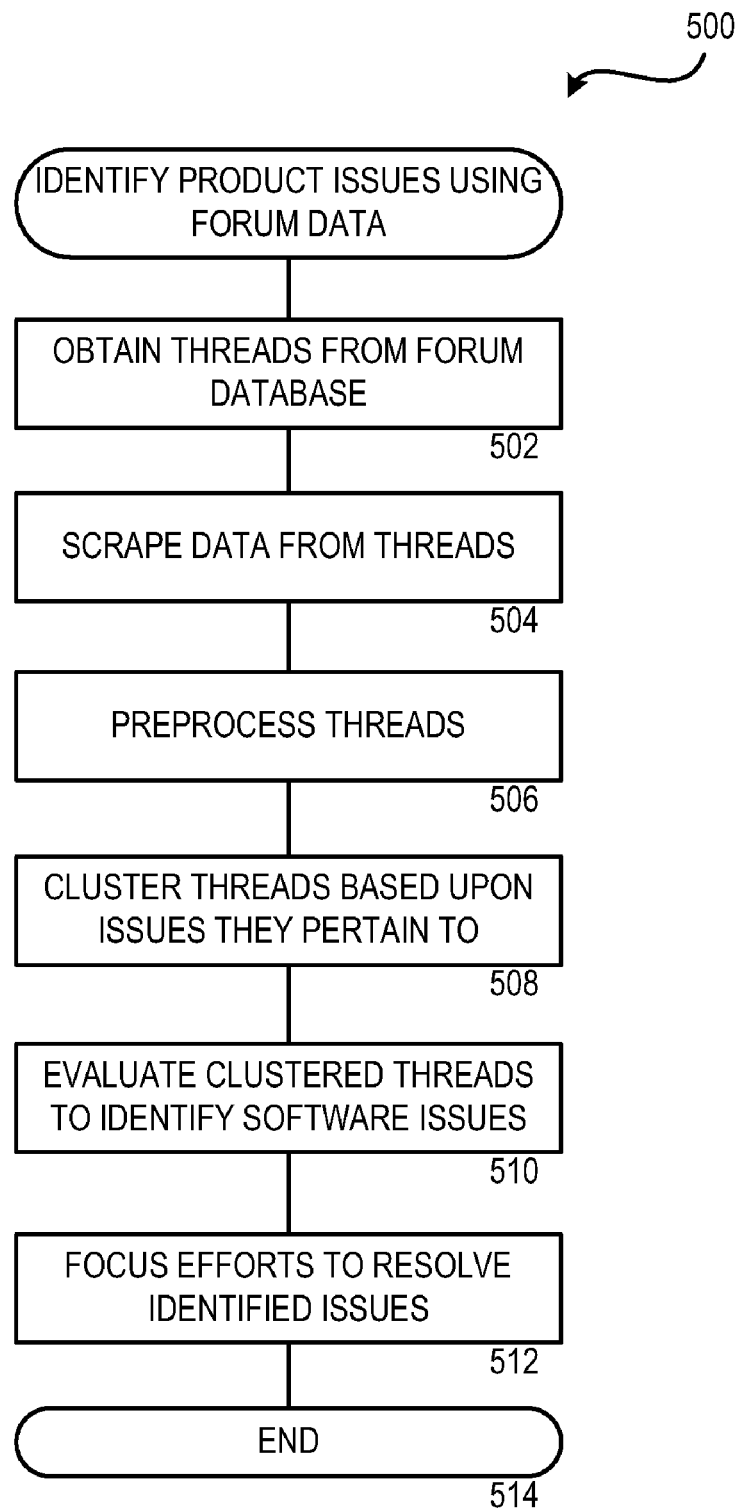
FIG. 5 is a flow diagram showing aspects of one process presented herein for identifying product issues using forum data.

Referring now to FIG. 5, additional details will be provided regarding the embodiments presented herein for identifying product issues using forum data. In particular, FIG. 5 is a flow diagram illustrating aspects of the operation of the forum crawler application 116 for identifying product issues using forum data in one embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the forum crawler application 116 obtains the forum threads from the forum database 114. According to embodiments, the forum crawler application 116 may be configured to "scrape" data from a specific page in a forum, or to start at a specific page and scrape data for all of the pages in the forum. In the latter case, the forum crawler application 116 scrapes all of the forum threads by traversing previous thread and next thread links that are posted within each thread page. The data scraped from the forums may be stored in a local database accessible to the forum crawler application 116. The scraping process occurs at operation 504 of the routine 500.

From operation 504, the routine 500 proceeds to operation 506, where the threads retrieved by the forum crawler application 116 are pre-processed. Pre-processing parses the individual threads and generates a set of tokens that can be utilized by the forum crawler application 116. For instance, any special characters and punctuation located within the forum threads may be removed. The sentences of the forum threads are split into tokens, and any stopwords within the forum threads are eliminated by comparing each term with a pre-defined dictionary of stopwords. A stopword is any token that would not convey meaning and would therefore be useless for inferring clusters.

According to embodiments, the pre-processing operation 506 also reduces any remaining tokens to their stem to minimize the number of tokens, and prunes the set of remaining tokens by eliminating those that have a very low or very high frequency of occurrence. Once the forum threads have been pre-processed, the operation 500 proceeds to operation 508, described below.

At operation 508, the forum crawler application 116 clusters the threads based upon the issues that the forum threads pertain to. As discussed above, strong and weak relationships between the forum threads may be identified in view of a user-settable threshold value. Forum threads that have relationships that exceed the user-specified threshold value would be grouped together and clustered under one issue. Once the forum threads have been clustered under issues, effective impact analysis may be carried out upon the clustered threads to identify product issues. This occurs at operation 510.

According to embodiments, the evaluation of the clustered threads to identify product issues includes identifying a product issue based upon the total number of views on a particular issue. For instance, a large number of views of one clustered thread may indicate the likelihood of a product issue with respect to the issue that the clustered threads correspond to. Similarly, a product issue may be identified based upon the total number of forum posts on an issue. In this example, a clustered thread that includes a large number of forum posts may be indicative of a product issue. In other embodiments, product issues may be identified based upon a trend and/or frequency analysis of the number of views and the number of forum posts on a particular issue.

From operation 510, the routine 500 proceeds to operation 512, where efforts are focused to resolve the issues identified at operation 510. For instance, according to embodiments, an impact analysis may be carried out on the product issues that were identified at the operation 510. Similarly, efforts may be focused to ameliorate the product issues identified at the operation 510. As an example, more targeted support may be provided to users that have encountered the identified product issues. In particular, solutions may be provided for the product issue to the effected users. In the case of a software product, for instance, a software patch directed to the identified issued may be provided to client computers 102 for implementation. Other types of efforts may be made based upon the analysis performed at the operation 510 to correct the identified product issues. From operation 512, the routine 500 proceeds to operation 514, where it ends.

According to embodiments, the routine 500 described above is repeated on a periodic basis in order to continually monitor for product issues. In other embodiments, new posts made by a user to the forums may be clustered in the manner described above in real or near-real time. In this case, the system 100 might be able to refer the user to other forum threads that contain solutions to the problem encountered by the user at the time they make the post. In this manner, a user can be immediately redirected to related forum posts based upon the content of their new forum post. Similarly, the user interface 200 described above in FIG. 2 may be modified to include links to related forum posts as determined by the forum crawler application 116 in the manner described above.

Figure 6:
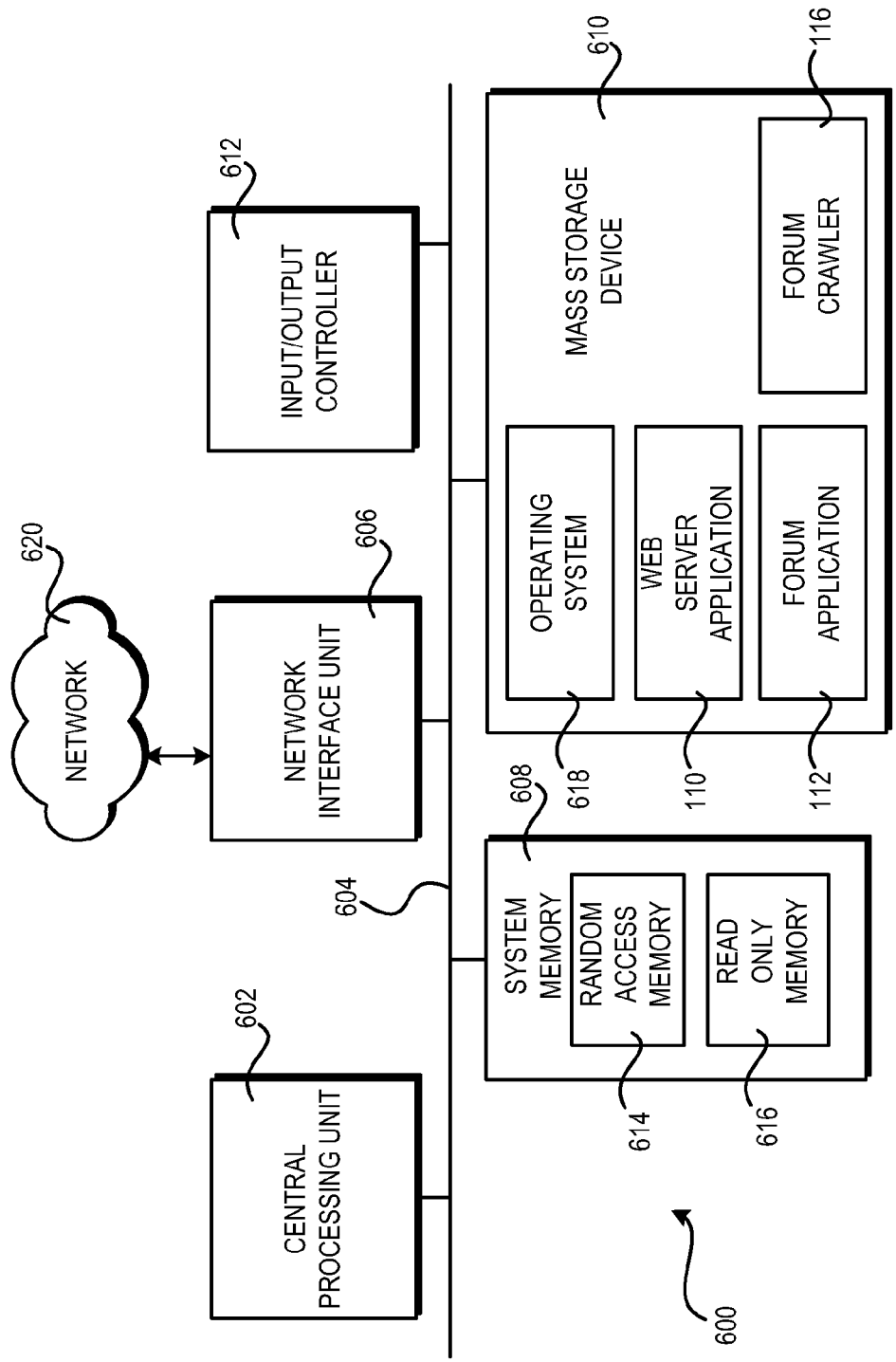
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for identifying product issues using forum data in the manner presented above. The computer architecture shown in FIG. 6 illustrates a conventional desktop, laptop, or server computer and may be utilized to execute any aspects of the software components presented herein described as executing on the client computer 102 or the server computer 106.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the Web server application 110, the forum application 112, and the forum crawler application 116, each of which was described in detail above with respect to FIGS. 1-5. The mass storage device 610 and the RAM 614 may also store other types of program modules.

Based on the foregoing, it should be appreciated that technologies for identifying product issues using forum data are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forums of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for identifying a product issue with a particular software product using forum data stored in a forum database, the method comprising:
   retrieving the forum data from the forum database;
   identifying a plurality of forum threads from the forum data;
   identifying a strength of relationship between each of a plurality of pairs of forum posts across separate forum threads in the plurality of forum threads;
   receiving a threshold for clustering the forum threads, the threshold defining a first set of forum threads having the strength of relationship meeting the threshold and a second set of forum threads having the strength of relationship not meeting the threshold;
   clustering the first set of forum threads into one or more clustered forum threads according to the threshold and keeping unclustered the second set of forum threads according to the threshold;
   evaluating the one or more clustered forum threads to identify the product issue with the particular software product; and
   providing a software patch to one or more client computers, the software patch being directed to correcting the product issue with the particular software product.

2. The method of claim 1, wherein clustering the forum threads comprises grouping related forum threads based upon a relationship between the forum threads.

3. The method of claim 2, wherein the relationship comprises either a strong relationship or a weak relationship.

4. The method of claim 3, wherein the strong relationship is indicated by a manual grouping of the related forum threads.

5. The method of claim 3, wherein the strong relationship is indicated by a similarity of keywords present in the related forum threads.

6. The method of claim 3, wherein the weak relationship is indicated by one or more hyperlinks within one forum thread linking the one forum thread to another forum thread.

7. The method of claim 3, wherein the weak relationship is indicated by an identity of a user that has posted to two or more of the plurality of forum threads.

8. The method of claim 1, wherein evaluating the clustered forum threads to identify the product issue comprises identifying the product issue based upon a total number of views on an issue related to the particular software product across separate forum threads.

9. The method of claim 1, wherein evaluating the clustered forum threads to identify the product issue comprises identifying the product issue based upon a total number of forum posts on an issue related to the particular software product across separate forum threads.

10. The method of claim 1, wherein evaluating the clustered forum threads to identify the product issue comprises identifying the product issue based upon a trend and a frequency analysis of a number of views on an issue related to the particular software product and a number of forum posts on the issue across separate forum threads.

11. The method of claim 1, further comprising, prior to clustering the forum threads, pre-processing the forum threads to eliminate punctuation, special characters, and stopwords from text of the forum threads.

12. A computer storage medium having computer executable instructions stored thereon which, when executed by a computer, cause the computer to:
   execute a forum crawler application, the forum crawler application being configured to retrieve forum data from a forum database, to identify a plurality of forum threads from the forum data, to identify a strength of relationship between each of a plurality of pairs of forum posts across separate forum threads in the plurality of forum threads, to receive a threshold for clustering the forum threads, the threshold defining a first set of forum threads having the strength of relationship meeting the threshold and a second set of forum threads having the strength of relationship not meeting the threshold, to cluster the first set of forum threads into one or more clustered forum threads according to the threshold and keep unclustered the second set of forum threads according to the threshold, to evaluate the one or more clustered forum threads to identify one or more product issues with a particular software product, and to cause a software patch to be provided to one or more client computers, the software patch being directed to correcting the product issue with the particular software product.

13. The computer storage medium of claim 12, wherein each of the identified strength of relationships comprises either a strong relationship or a weak relationship.

14. The computer storage medium of claim 13, wherein the strong relationship is indicated by one or more of a manual grouping of related forum threads and a similarity of keywords present in different forum threads.

15. The computer storage medium of claim 14, wherein the weak relationship is indicated by one or more of a hyperlink from one forum thread to another forum thread and an identity of a user that has posted to two or more of the plurality of forum threads.

16. The computer storage medium of claim 15, wherein, in being configured to evaluate the clustered forum threads to identify the one or more product issues, the forum crawler application is configured to evaluate the clustered forum threads to identify the one or more product issues based upon one or more of a total number of views on an issue related to the particular software product, a total number of forum posts on the issue, and a trend and a frequency analysis of a number of views on the issue and a number of forum posts on the issue.

17. A computing system configured to identify a product issue with a particular software product using forum data stored in a forum database, the computing system comprising:
 a central processing unit; and
 a mass storage device storing a forum crawler application which, when executed by the central processing unit, causes the computing system to identify a plurality of forum threads from the forum data, each of the forum threads comprising one or more posts, to identify a strength of relationship between each of a plurality of pairs of forum posts across separate forum threads in the plurality of forum threads, to receive a threshold for clustering the forum threads, the threshold defining a first set of forum threads having the strength of relationship meeting the threshold and a second set of forum threads having the strength of relationship not meeting the threshold, to cluster the first set of forum threads into one or more clustered forum threads according to the threshold and keep unclustered the second set of forum threads according to the threshold, to evaluate the one or more clustered forum threads to identify the product issue with the particular software product, and to cause a software patch to be provided to one or more client computers, the software patch being directed to correcting the product issue with the particular software product;
 wherein the computing system identifies the product issue based upon one or more of a total number of views on an issue related to the particular software product across the separate forum threads, a total number of forum posts on the issue across the separate forum threads, and a trend and a frequency analysis of a number of views on the issue and a number of forum posts on the issue across the separate forum threads.

18. The computing system of claim 17, wherein a strong relationship is indicated by one or more of a manual grouping of related forum threads and a similarity of keywords present in different forum threads.

19. The computing system of claim 17, wherein a weak relationship is indicated by one or more of a hyperlink within one forum thread linking the one forum thread to another forum thread and an identity of a user that has posted to two or more of the plurality of forum threads.

* * * * *